(12) United States Patent
Sakagami et al.

(10) Patent No.: US 11,990,154 B1
(45) Date of Patent: May 21, 2024

(54) SEEK TIME TO THE BEGINNING POSITION OF DATA ON TAPE MEDIA

(71) Applicant: Western Digital Technologies, Inc., San Jose, CA (US)

(72) Inventors: Akira Sakagami, Kanagawa (JP); Takehiko Hamaguchi, Fujisawa (JP); Keiichi Okada, Yokohama (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/350,580

(22) Filed: Jul. 11, 2023

Related U.S. Application Data

(60) Provisional application No. 63/455,508, filed on Mar. 29, 2023.

(51) Int. Cl.
  *G11B 5/00* (2006.01)
  *G11B 5/008* (2006.01)
  (Continued)

(52) U.S. Cl.
  CPC ........ *G11B 21/086* (2013.01); *G11B 5/00813* (2013.01)

(58) Field of Classification Search
  CPC ... G11B 15/46; G11B 15/442; G11B 15/1833; G11B 15/1841; G11B 15/185;
  (Continued)

(56) References Cited

U.S. PATENT DOCUMENTS

| 4,285,016 A | 8/1981 | Gilovich |
| 4,723,181 A | 2/1988 | Hickok |

(Continued)

FOREIGN PATENT DOCUMENTS

| EP | 1528553 A2 | 5/2005 |
| WO | 2006112937 A2 | 10/2006 |
| WO | 2012025492 A1 | 3/2012 |

OTHER PUBLICATIONS

Fred Moore, "Access Time and Throughput Take Off", Tape Performance Accelerates (2020 Technology Update Series).
(Continued)

*Primary Examiner* — Nabil Z Hindi
(74) *Attorney, Agent, or Firm* — PATTERSON + SHERIDAN, LLP

(57) ABSTRACT

The present disclosure generally relates to data storage devices, comprising: a magnetic tape; a tape head configured to write data to and read data from the magnetic tape; a first reel having a first interior surface; a second reel, wherein the first reel and the second reel are configured to wind and unwind the magnetic tape; one or more motors configured to actuate the first reel and the second reel; a first magnetic recording surface disposed on the first interior surface of the first reel; an actuating arm disposed between the first reel and the second reel; an actuator coupled to a distal end of the actuating arm; and a magnetic recording head disposed on the actuating arm. The magnetic recording head being situated a distance away from the actuator, wherein the actuating arm is configured to move about the actuator such that the magnetic recording head is able to contact the first magnetic recording surface to write data to and read data from the first magnetic recording surface.

21 Claims, 12 Drawing Sheets

(51) Int. Cl.
*G11B 15/18* (2006.01)
*G11B 21/08* (2006.01)

(58) Field of Classification Search
CPC ..... G11B 5/588; G11B 5/5513; G11B 5/5591; G11B 5/21; G11B 15/1805; G11B 15/6653; G11B 5/00
USPC .................................. 360/74.4, 77.12, 78.02
See application file for complete search history.

(56) References Cited

U.S. PATENT DOCUMENTS

| | | |
|---|---|---|
| 8,867,160 B2 | 10/2014 | Katagiri et al. |
| 9,263,082 B2 | 2/2016 | Hetzler et al. |
| 9,280,997 B2 * | 3/2016 | Natsui ..................... G11B 5/64 |
| 2011/0238716 A1 | 9/2011 | Amir et al. |

OTHER PUBLICATIONS

Bruce Gilpin, "Designing a High Performance Tape Archive", (2018).

* cited by examiner

SEEK TIME TO THE BEGINNING POSITION OF DATA ON TAPE MEDIA

CROSS-REFERENCE TO RELATED APPLICATIONS

This application claims benefit of U.S. Provisional Patent Application Ser. No. 63/455,508, filed Mar. 29, 2023, which is herein incorporated by reference.

BACKGROUND OF THE DISCLOSURE

Field of the Disclosure

Embodiments of the present disclosure generally relate to a tape drive system that incorporates a magnetic recording surface.

Description of the Related Art

Tape heads of tape drive systems are used to record and read back information on tapes by magnetic processes. Magnetic transducers of the tape heads read data from and write data onto magnetic recording media. Data is written on the magnetic recording media by moving a magnetic write transducer to a position over the media where the data is to be stored. The magnetic write transducer then generates a magnetic field, which encodes the data into the magnetic media. Data is read from the media by similarly positioning the magnetic read transducer and then sensing the magnetic field of the magnetic media.

In dual-reel removable tape devices and fixed tape devices, the tape media is wound on two reels, which has the feature of shorter access time compared to single-reel tape devices that are widely used in the tape market today. In order to fully utilize the shorter access time, a method called midpoint loading is commonly known.

Midpoint loading refers to a method in which the tape media wound around each tape reel are equal in length to one another, and the tape head waits at the midpoint of half the total tape length in the default state. Utilizing midpoint loading, the maximum seek time may be 200 seconds when the tape has a length of 1 km and moves at a speed of 5 m/s. Thus, current methods of storing information on dual-reel removable tape devices have impermissibly long seek times.

Therefore, there is a need in the art for an improved tape drive with a faster seek time to the access start position.

SUMMARY OF THE DISCLOSURE

The present disclosure generally relates to data storage devices, comprising: a magnetic tape; a tape head configured to write data to and read data from the magnetic tape; a first reel having a first interior surface; a second reel, wherein the first reel and the second reel are configured to wind and unwind the magnetic tape; one or more motors configured to actuate the first reel and the second reel; a first magnetic recording surface disposed on the first interior surface of the first reel; an actuating arm disposed between the first reel and the second reel; an actuator coupled to a distal end of the actuating arm; and a magnetic recording head disposed on the actuating arm. The magnetic recording head being situated a distance away from the actuator, wherein the actuating arm is configured to move about the actuator such that the magnetic recording head is able to contact the first magnetic recording surface to write data to and read data from the first magnetic recording surface.

In one embodiment, a data storage device, comprising: a magnetic tape; a tape head configured to write data to and read data from the magnetic tape; a first reel having a first interior surface; a second reel, wherein the first reel and the second reel are configured to wind and unwind the magnetic tape; one or more motors configured to actuate the first reel and the second reel; a first magnetic recording surface disposed on the first interior surface of the first reel; an actuating arm disposed between the first reel and the second reel; an actuator coupled to a distal end of the actuating arm; and a magnetic recording head disposed on the actuating arm. The magnetic recording head being situated a distance away from the actuator, wherein the actuating arm is configured to move about the actuator such that the magnetic recording head is able to contact the first magnetic recording surface to write data to and read data from the first magnetic recording surface.

In another embodiment, a data storage device, comprising: a magnetic tape; a tape head configured to write data to and read data from the magnetic tape; a pair of reels having a pair of interior surfaces, wherein the pair of reels are configured to wind and unwind the magnetic tape; one or more motors configured to actuate the pair of reels; a pair of magnetic recording surfaces disposed on each interior surface of the pair of interior surfaces; an actuating arm disposed between the pair of reels; a magnetic recording head disposed on a first end of the actuating arm, the first end being disposed adjacent to the pair of reels; and an actuator coupled to a second end of the actuating arm opposite the magnetic recording head. The actuator is configured to move the actuating arm in a first direction and a second direction opposite the first direction such that the magnetic recording head is able to contact the pair of magnetic recording surfaces.

In yet another embodiment, a data storage device, comprising: a magnetic tape; a tape head configured to write data to and read data from the magnetic tape; a pair of reels, each reel having an interior surface, wherein the pair of reels are configured to wind and unwind the magnetic tape; one or more motors configured to actuate the pair of reels; a magnetic recording surface disposed on each interior surface of the pair of reels; an actuating arm disposed between the pair of reels; a magnetic recording head disposed on a first end of the actuating arm, the first end being disposed adjacent to the pair of reels; and means for moving the actuating arm in a first direction and a second direction opposite the first direction such that the magnetic recording head is able to contact the pair of magnetic recording surfaces; and a control circuitry. The control circuitry configured to: position the magnetic recording head on each magnetic recording surface; perform a seek function on a first plurality of data on at least one of the magnetic recording surfaces; control the magnetic recording head to read data from or write to at least one of the magnetic recording surfaces; perform a seek function on a second plurality of data on the magnetic tape; and control the tape head to read from or write to the magnetic tape.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, comprising: a magnetic tape; a tape head configured to write data to and read data from the magnetic tape; a first reel having a first interior surface; a second reel, wherein the first reel and the second reel are configured to wind and unwind the magnetic tape; one or more motors configured to actuate the first reel and the second reel; a first magnetic recording surface disposed on the first interior surface of the first reel; an actuating arm disposed between the first reel and the second reel; an actuator coupled to a distal end of the actuating arm; and a magnetic recording head disposed on the actuating arm. The magnetic recording head being situated a distance away from the actuator, wherein the actuating arm is configured to move about the actuator such that the magnetic recording head is able to contact the first magnetic recording surface to write data to and read data from the first magnetic recording surface.

Figure 1A:
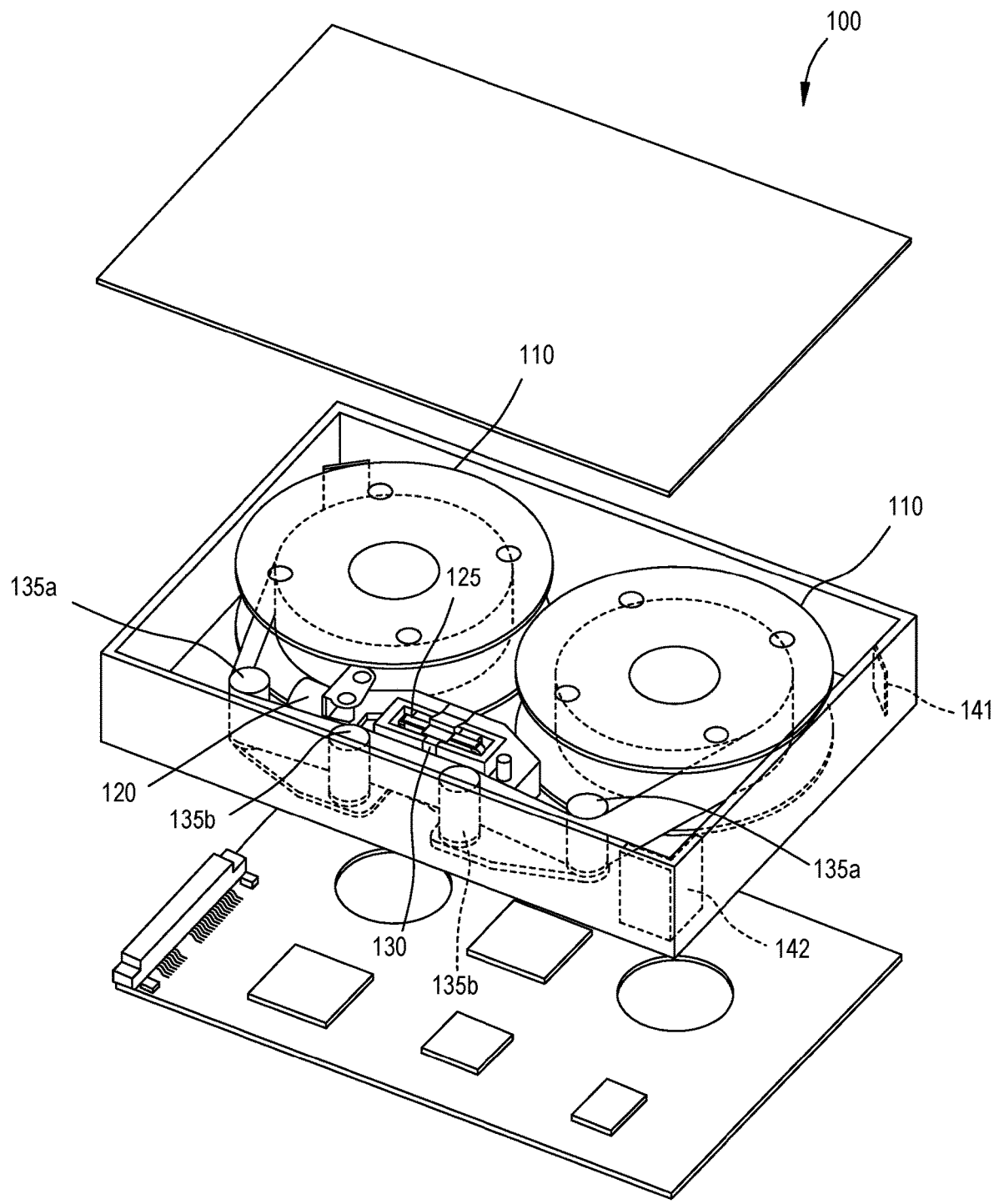
FIGS. 1A-1C illustrate a perspective exploded view, a simplified top down view, and side profile view of a tape drive, in accordance with some embodiments of the present disclosure.
Figure 1B:
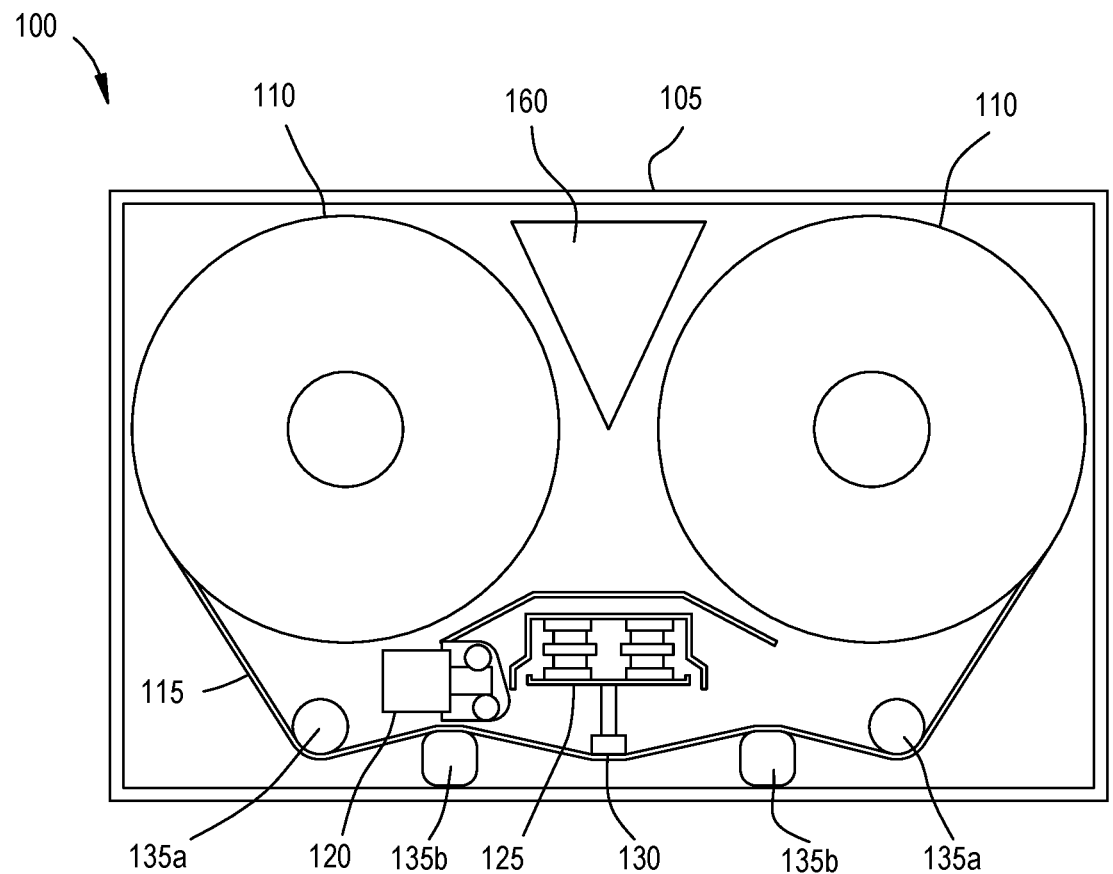
Figure 1C:
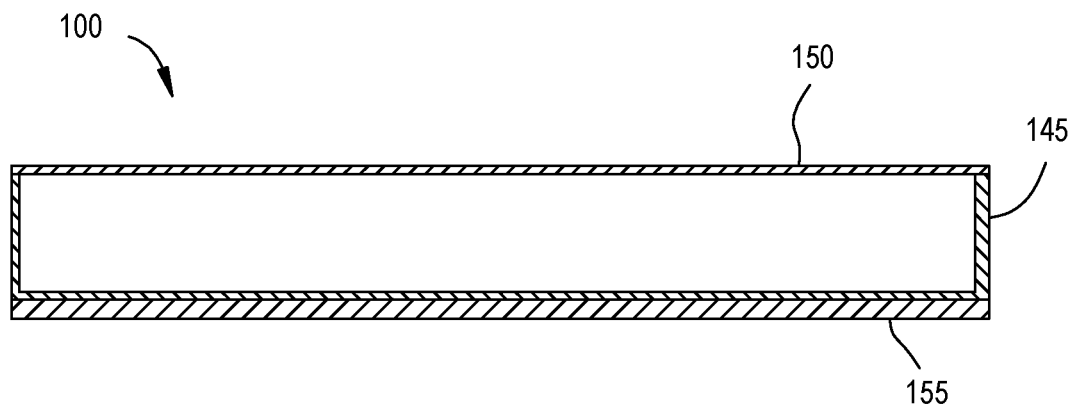

FIGS. 1A-1C illustrate a perspective exploded view, a simplified top down, and side profile view of a tape drive 100, in accordance with some embodiments. The tape drive 100 may be a tape embedded drive (TED). Focusing on FIG. 1B, for example, the tape drive comprises a casing 105, one or more tape reels 110, one or more motors (e.g., a stepping motor 120 (also known as a stepper motor), a voice coil motor (VCM) 125, etc.) a head assembly 130 with one or more read heads and one or more write heads, and tape guides/rollers 135a, 135b. In the descriptions herein, the term "head assembly" may be referred to as "magnetic recording head", interchangeably, for exemplary purposes. Focusing on FIG. 1C, for example, the tape drive further comprises a printed circuit board assembly (PCBA) 155. In an embodiment, most of the components are within an interior cavity of the casing, except the PCBA 155, which is mounted on an external surface of the casing 105. The same components are illustrated in a perspective view in FIG. 1A. In the descriptions herein, the term "tape" may be referred to as "magnetic media", interchangeably, for exemplary purposes.

In the illustrated embodiments, two tape reels 110 are placed in the interior cavity of the casing 105, with the center of the two tape reels 110 on the same level in the cavity and with the head assembly 130 located in the middle and below the two tape reels 110. Tape reel motors located in the spindles of the tape reels 110 can operate to wind and unwind the tape media 115 in the tape reels 110. Each tape reel 110 may also incorporate a tape folder to help the tape media 115 be neatly wound onto the reel 110. One or more of the tape reels 110 may form a part of a removable cartridge and are not necessarily part of the tape drive 100. In such embodiments, the tape drive 100 may not be a tape embedded drive as it does not have embedded media, the drive 100 may instead be a tape drive configured to accept and access magnetic media or tape media 115 from an insertable cassette or cartridge (e.g., an LTO drive), where the insertable cassette or cartridge further comprises one or more of the tape reels 110 as well. In such embodiments, the tape or media 115 is contained in a cartridge that is removable from the drive 100. The tape media 115 may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels 110 are biased against the guides/rollers 135a, 135b (collectively referred to as guides/rollers 135) and are movably passed along the head assembly 130 by movement of the reels 110. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor 125 and stepping motor 120 may variably position the tape head(s) transversely with respect to the width of the recording tape. The stepping motor 120 may provide coarse movement, while the voice coil motor 125 may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape drive 100 within the casing 105. In particular, as the head mechanism is internal to the casing in certain embodiments, the tape media 115 may not be exposed to the outside of the casing 105, such as in conventional tape drives. Thus, the tape media 115 does not need to be routed along the edge of the casing 105 and can be freely routed in more compact and/or otherwise more efficient ways within the casing 105. Similarly, the head(s) 130 and tape reels 110 may be placed in a variety of locations to achieve a more efficient layout, as there are no design requirements to provide external access to these components.

Figure 2A:
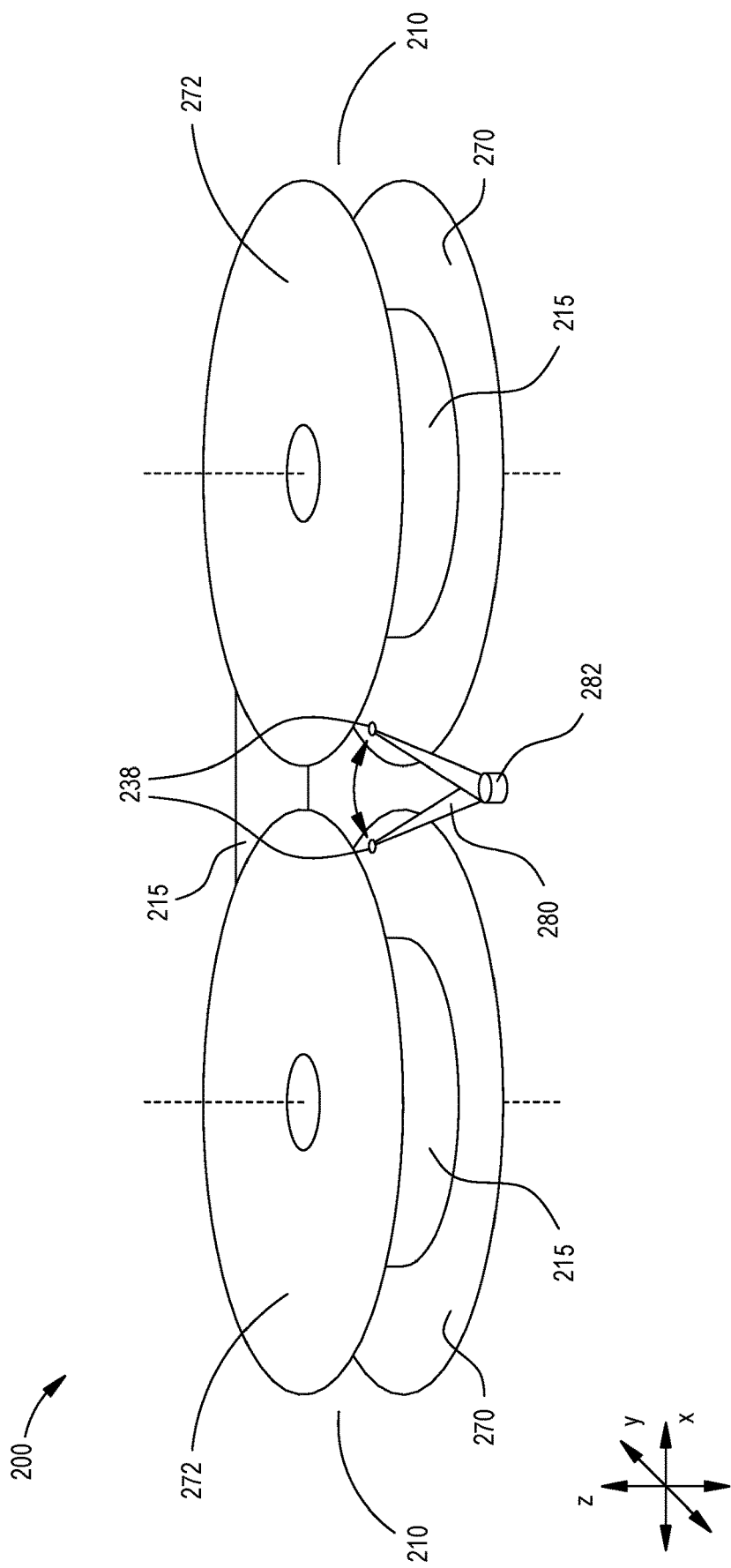
FIGS. 2A-2C illustrate perspective views and a simplified top down view, in accordance with some embodiments of the present disclosure.
Figure 2B:
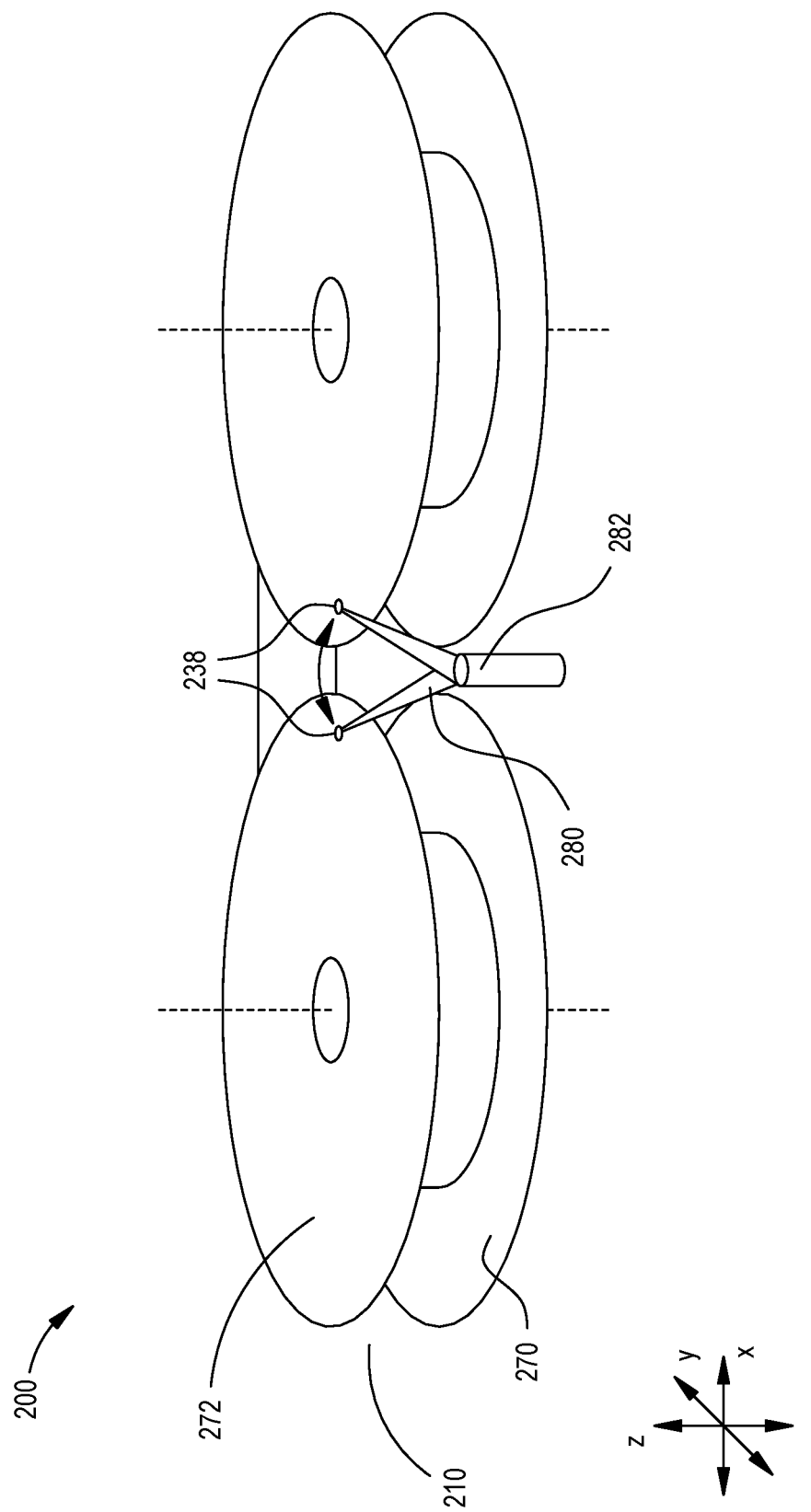
Figure 2C:
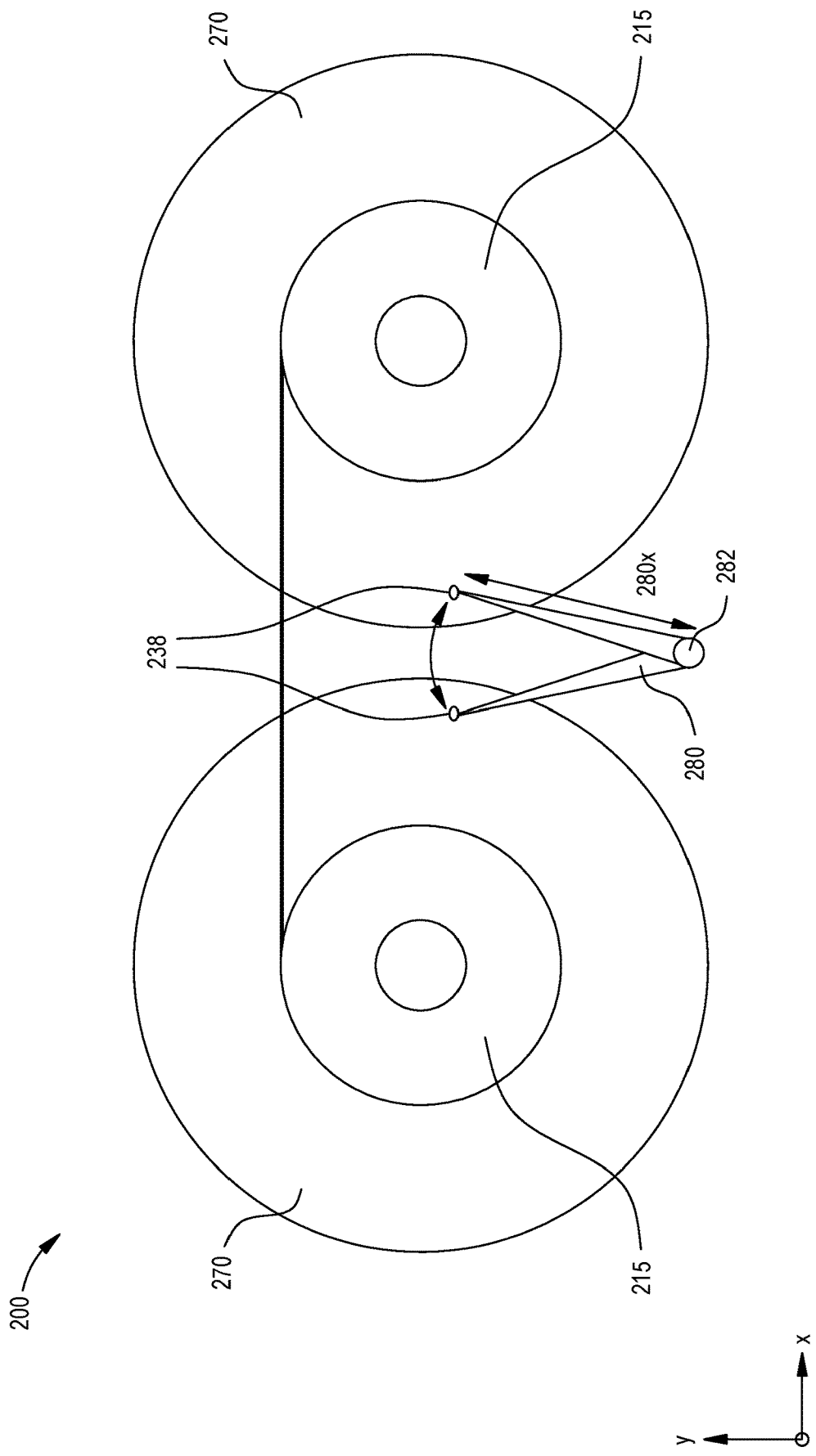

Based on the layout in FIG. 1B, there is an area of wasted space 160. This wasted space 160 may be more effectively utilized as shown in FIGS. 2A-2C.

As illustrated in FIG. 1C, the casing 105 comprises a cover 150 and a base 145. The PCBA 155 is attached to the bottom, on an external surface of the casing 105, opposite the cover 150. As the PCBA 155 is made of solid state electronics, environmental issues are less of a concern, so it does not need to be placed inside the casing 105. That leaves room inside casing 105 for other components, particularly, the moving components and the tape media 115 that would benefit from a more protected environment.

In some embodiments, the tape drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, the cover 150 is used to hermetically seal the tape drive. For example, the drive 100 may be hermetically sealed for environmental control by attaching (e.g., laser welding, adhesive, etc.) the cover 150 to the base 145. The drive 100 may be filled by helium, nitrogen, hydrogen, or any other typically inert gas.

In some embodiments, other components may be added to the tape drive 100. For example, a pre-amp for the heads may be added to the tape drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

In various embodiments, the drive 100 includes controller 140 integrated circuits (IC) (or more simply "a controller 140") (e.g., in the form of one or more System on Chip (SoC)), along with other digital and/or analog control circuitry to control the operations of the drive. For example, the controller 140 and other associated control circuitry may control the writing and reading of data to and from the magnetic media, including processing of read/write data signals and any servo-mechanical control of the media and head module. In the description below, various examples related to writing and reading and verifying of written data, as well as control of the tape head and media to achieve the same, may be controlled by the controller 140. As an example, the controller 140 may be configured to execute firmware instructions for the various same gap verify embodiments described below.

FIGS. 2A-2B illustrate perspective views of a data storage device 200, in accordance with some embodiments of the present disclosure. FIG. 2C illustrates a simplified top down view of a data storage device 200, in accordance with some embodiments of the present disclosure. The data storage device 200 may be the tape drive 100 of FIG. 1A. As such, the tape 215 may be the tape 115 and the reels 210 may be the reels 110. While not shown in FIGS. 2A-2C, the data storage device 200 comprises the head assembly 130.

An actuating arm 280 is located between the two reels 210 opposite the head assembly 130. In FIGS. 2A-2C, the actuating arm 280 is located across from where the tape 215 bridges between the two reels 210. However, it is contemplated that the actuating arm 280 may be placed in a different location. In one embodiment, the actuating arm 280 is located in the wasted space 160 shown in FIG. 1B.

The actuating arm 280 is capable of pivoting between the two reels 210. In FIGS. 2A-2C, two positions of the actuating arm 280 are shown. However, it is contemplated that the actuating arm 280 may have a wider range of motion than what is shown in FIGS. 2A-2C. The actuating arm 280 has an actuator 282 at one end, and a magnetic recording head 238 at an opposite end. In FIGS. 2A-2C, the actuator 282 is located at a position approximately at the center between the pair of reels 210. The actuator 282 moves the actuating arm 280 and the magnetic recording head 238 between the two reels 210. It is contemplated that the actuator 282 may be located anywhere within the assembly.

As seen in FIG. 2A, a pair of reels 210 have an interior surface 270 and an exterior surface 272. In FIGS. 2A and 2C, both reels 210 have magnetic recording surfaces on the interior surfaces 270. In FIG. 2B, both reels 210 have magnetic recording surfaces on the exterior surfaces 272. In one embodiment, the magnetic recording surface may be located on the interior surface 270 as to minimize the size of the cover 150. The magnetic recording surface may cover all or a portion of the interior surface 270 or the exterior surface 272. It is contemplated that one of the reels 210 has a magnetic recording surface, and the second reel 210 does not have a magnetic recording surface. The magnetic recording surface may be a separately manufactured disk that is applied to the reels 210.

In some embodiments, both the interior surface 270 and the exterior surface 272 have a magnetic recording surface. In some embodiments, the actuator 282 may be configured to move the actuating arm 280 and the magnetic recording head 238 between the interior surface 270 and the exterior surface 272 (on the z-axis), as well as between both reels 210. In some embodiments, two actuating arms 280 may be located on the actuator 282 (not shown). The first actuating arm 280 may be configured to interact with the exterior surface 272, and the second actuating arm 280 may be configured to interact with the interior surface 270. Alternatively, the first actuating arm may be configured to interact with the exterior surface 272 and the interior surface of one reel 210 while the second actuating arm is configured to interact with the exterior surface 272 and the interior surface of the other reel 210. In embodiments with multiple actuating arms 280, the actuating arms 280 may be configured to move independently. In some embodiments, one reel 210 may have a magnetic recording surface on the interior surface 270, and the second reel 210 may have a magnetic recording surface on the exterior surface 272.

The actuating arm 280 has a length 280x which is long enough that the magnetic recording head 238 can reach all of the magnetic recording surface on the interior surface 270 and/or exterior surface 272 of the reels 210. The length 280x of the actuating arm 280 may be sized to reach both the outermost and innermost circumference of the reels 210.

In one embodiment, the magnetic recording head 238 may be connected to the actuating arm 280 via one or more sliders. As the reels 210 rotate, the magnetic recording surface(s) rotate. The one or more sliders may move radially (on the x-y plane) in and out over the magnetic recording surface(s) so that the magnetic recording head 238 may access different tracks of the magnetic recording surface. Each slider may be attached to the actuating arm 280 via a suspension. The suspension provides a slight spring force which biases the slider towards the magnetic recording surface(s).

In one embodiment, the actuator 282 may be a voice coil motor (VCM). The VCM includes a coil moveable within a fixed magnetic field, the direction and speed of the coil movements being controlled by the motor current signals supplied by a control unit.

In one embodiment, the magnetic recording head 238 may be a plurality of magnetic recording heads (such as read/write heads), such as a write head including a spintronic device.

In one embodiment, the magnetic recording head 238 includes a media facing surface (MFS) such as an air bearing surface (ABS) that faces the magnetic recording surface(s). During operation of the magnetic recording head, the rotation of the reels 210 generates an air or upward force or lift on the magnetic recording head 238. The air or gas bearing thus counter-balances the slight spring force of the actuating arm 280 or the suspension and supports the actuating arm 280 or the slider off and slightly above the magnetic recording surface(s) by a small, substantially constant spacing during operation.

The various components connected to the actuator 282 are controlled by a controlling unit. The controlling unit may be the controller 140. The controlling unit generates control signals such as access control signals and internal clock signals. The controlling unit includes logic control circuits, storage means, and a microprocessor. The controlling unit generates control signals to control various system operations such as drive motor control signals and head position and seek control signals. The control signals provide the desired current profiles to optimally move and position the slider to the desired data track on rotatable magnetic recording surface. Write and read signals are communicated to and from the magnetic recording head by way of a recording channel.

Figure 3A:
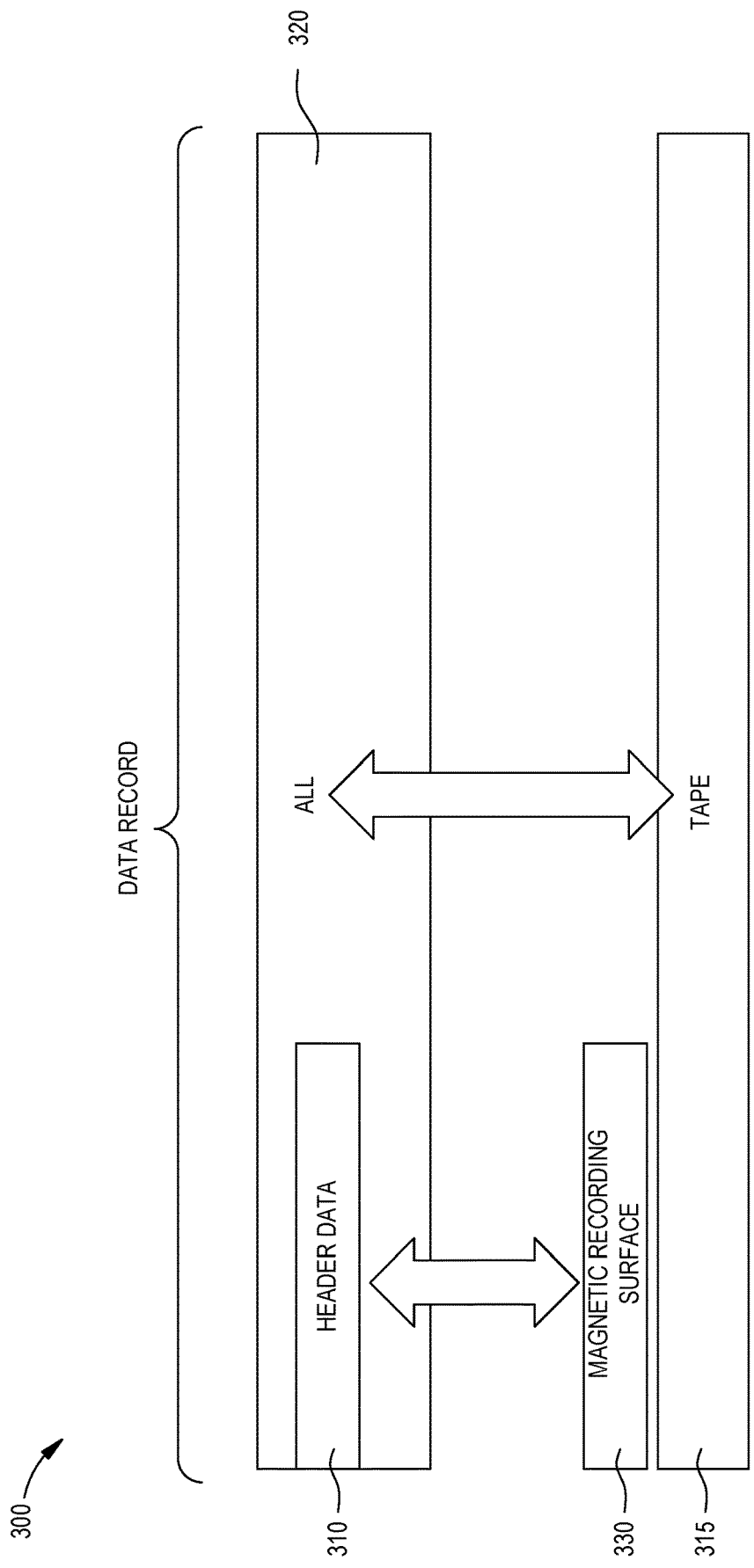
FIGS. 3A-3B are diagrams depicting a configuration of all data recorded and a method of accessing the data, in accordance with one embodiment of the present disclosure.
Figure 3B:
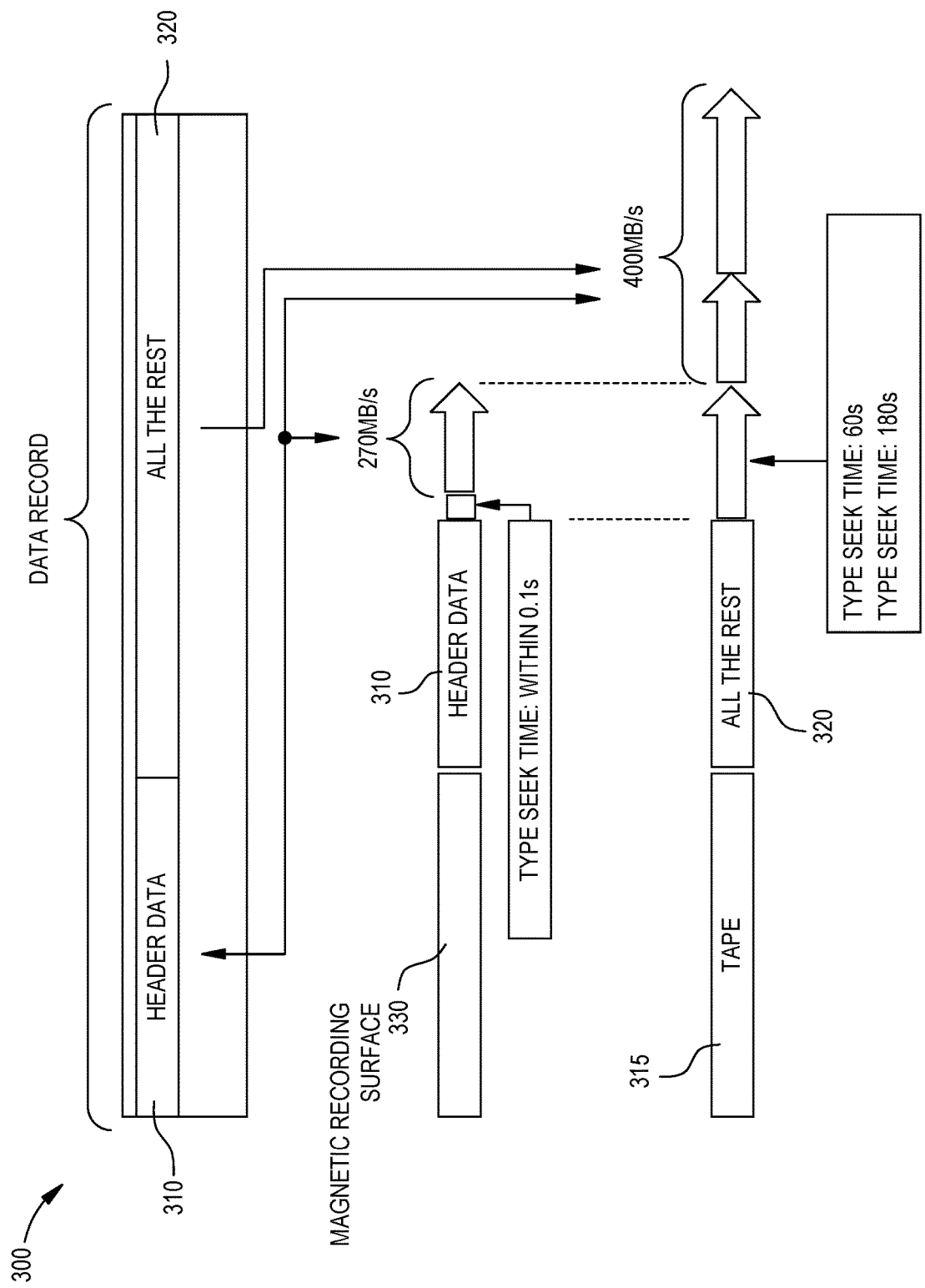

FIGS. 3A-3B are diagrams depicting a configuration of all the rest of the recorded data 300 recorded by the data storage device 200 of FIGS. 2A-2C, and a method of accessing the data, in accordance with one embodiment of the present disclosure. In the configuration in FIG. 3A, header data 310 is part of all the rest of the recorded data 300. The header data 310 is stored on the magnetic recording surface 330. All the rest of the recorded data 300, including header data 310, is stored on the tape 315. Data from all the rest of the recorded data 300, which is not header data 310, may be user data. The header data 310 may be data related to the all of the rest of the recorded data 300, such as where the all of the rest of the recorded data 300 is stored on the tape 315.

In FIG. 3B, all of the rest of the recorded data 300 is accessed in parallel. The header data 310, stored on the magnetic recording surface 330 of the reels (i.e., the exterior surface 272 and/or the interior surface 270 shown in FIGS. 2A-2C), has a faster seek time, within about 0.1 seconds. All the rest of the data 300, stored on the tape 315, has a slower seek time, ranging between about 60 seconds to about 180 seconds. Despite the lower seek time, the magnetic recording surface 330 has a lower sustained data rate, such as 270 MB/s. Additionally, despite the higher seek time, the tape 315 has a higher sustained data rate, such as 400 MB/s.

Figure 4:
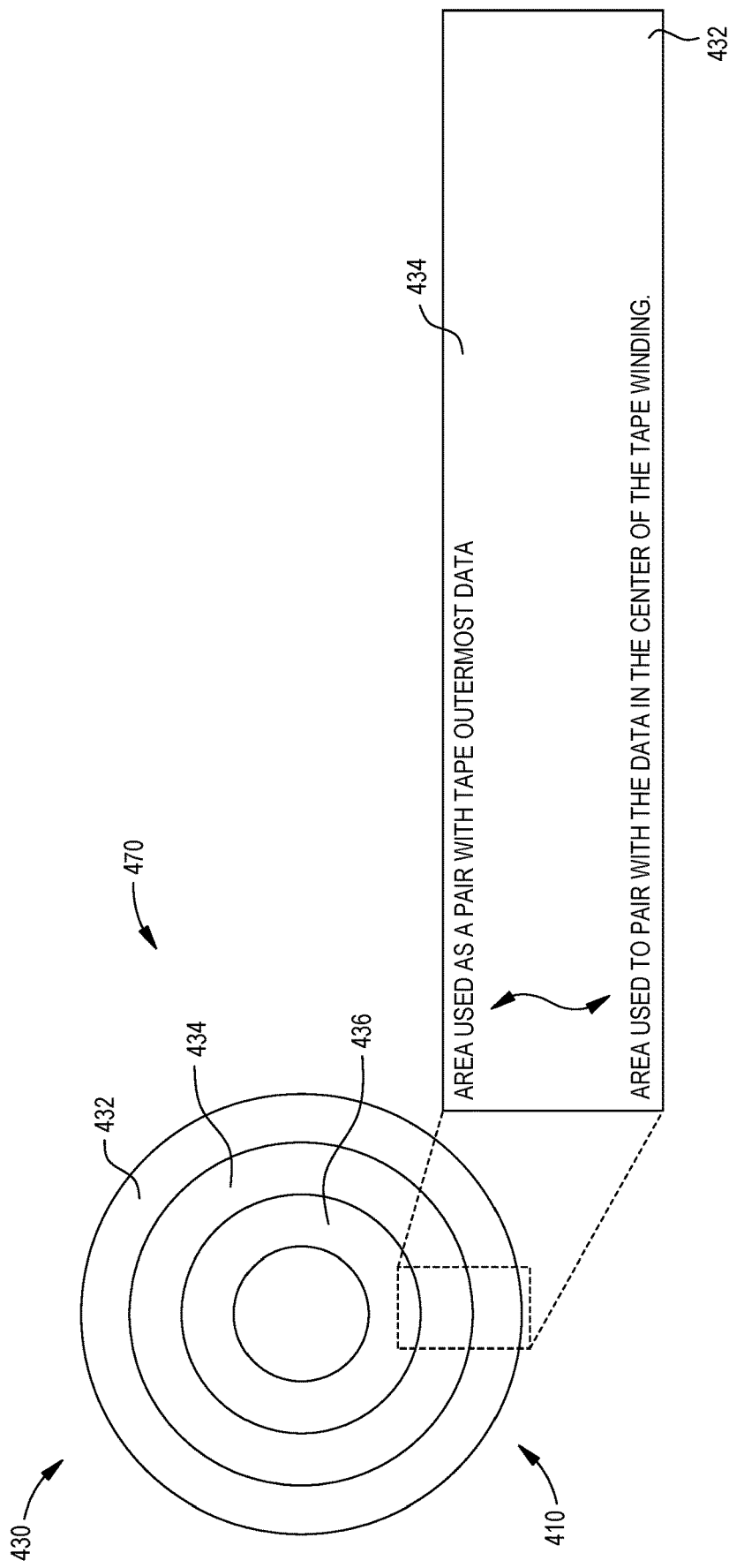
FIG. 4 illustrates a simplified top down view of a tape drive and a data storage configuration on a magnetic recording surface, in accordance with one embodiment of the present disclosure.

Without being limited to theory, the interior surface 270 of the reels 210 may be partially or wholly covered by tape 215 during different stages of data processing. Therefore, the data storage location of the header data 310 on the magnetic recording surface 330 may be configured based on the associated tape positioning. FIG. 4 illustrates a simplified top down view of a reel of a tape drive and a data storage configuration on a magnetic recording surface 430, in accordance with one embodiment of the present disclosure. The reel 410 may be the reel 210 of FIG. 2 or the reel 110 of FIGS. 1A-1B. As such, the interior surface 470 may be the interior surface 270 of FIGS. 2A-2C. Additionally, the magnetic surface 430 may be the magnetic recording surface 330 in FIGS. 3A-3B.

In FIG. 4, a magnetic surface 430 on the interior surface of the reel 410 is divided into storage segments 432, 434. In this view, the center of the magnetic surface 430 is co-axial with the center of the tape reel as shown by the magnetic surface 270 in FIG. 2B. An outer segment 432 is located towards the exterior of the magnetic recording surface 430. The outer segment 432 may be reserved mainly for data associated with the center of the tape. An inner segment 434 is located towards the interior of the magnetic recording surface 430. The inner segment 434 may be reserved mainly for data associated with the beginning of the tape and end of the tape. There is also an area 436 on the interior surface 470 of the reel 410. The central-most area 436 does not have a magnetic recording surface 430. If there is a need for greater data storage capacity, the magnetic recording surface 430 may be extended into the area 436. It is also contemplated that there is no area 436, and the magnetic recording surface 430 covers the entire interior surface of the reel 410.

The concepts of "outermost" vs. "innermost" tape data here refer to data stored on the particular portions of the tape as determined by position of wounding on the tape reel, referenced in radial locations relative to the center of the tape reel. For example, the innermost tape may refer to an end portion (such as beginning of tape (BOT) or end of tape (EOT)) of tape media attached to a reel, which as wound, would be physically closest to the center of the tape reel, in the radial direction. The outermost tape would then be referring to the other end of the tape media in this example, which when wound, would be physically farthest from the center of the tape reel, in the radial direction. As further described in FIG. 5, the wounding state of the tape media at each reel would also determine the "innermost" vs "outermost" location.

As shown in an enlarged view of box A, segment 434 and segment 432 exist on a continuum. In this embodiment header data associated with the outermost tape data is located closest to the center of the magnetic recording surface 430. Header data associated with the center of the tape is located nearest the edge of the magnetic recording surface 430. Header data associated with tape areas between the center and outermost points of the tape is ordered on the magnetic recording surface 430 in accordance with its proximity to the center of the tape. It is also contemplated that segment 434 and segment 432 are discrete segments of the magnetic recording surface. The tape may be divided into a discrete number of segments, and the magnetic recording surface 430 is divided into the same number of discrete segments. The discrete segments are located on the magnetic recording surface 430 based on the proximity of the segment to the center of the tape. The header data is distributed into the segments based on the proximity of the data to the center of the tape. The location of the header data within each segment is not dependent on the proximity of the data to the center of the tape. The number of segments may be based on the length of the tape, the amount of data to be stored, or other data storage concerns.

Figure 5:
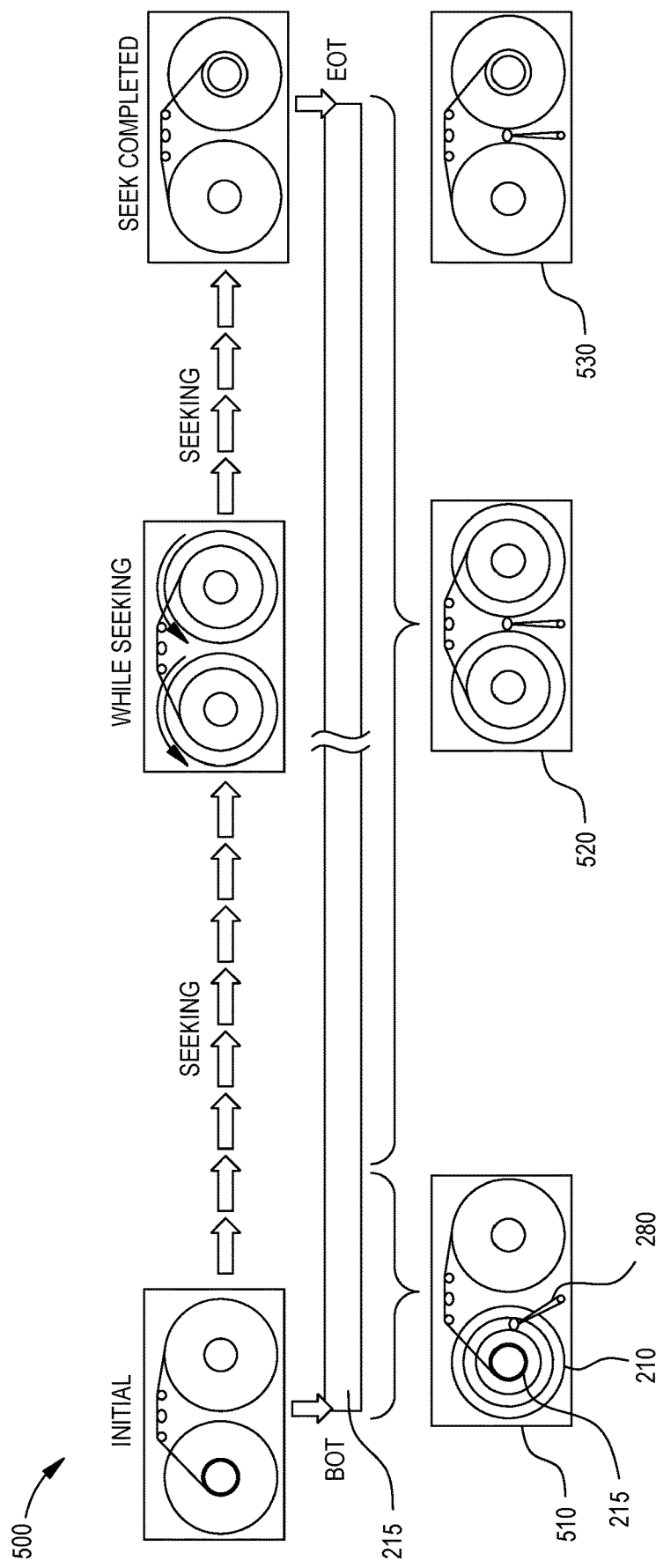
FIG. 5 illustrates a diagram of a method of reading/writing data in the scenario of maximum seek time, in accordance with one embodiment of the present disclosure.

FIG. 5 illustrates a diagram of a method 500 of reading/writing data in the scenario of maximum seek time, in accordance with one embodiment of the present disclosure. The method 500 may be utilized with the data storage device 200 of FIGS. 2A-2C. As such, FIGS. 2A-2C may be referred below. Method 500 details the processing of data when the desired data is located near the outermost portion of the tape 215, such as at the end of the tape (EOT), and the tape 215 is completely wound about that point.

In operation 510, the data processing is initialized. In FIG. 5, all or almost all of the tape 215 is on the right reel 210 in the initial position, or at the beginning of the tape (BOT), and the desired data is located near the end of the tape (EOT). The actuating arm 280 and the magnetic recording head 238 are tuned to the reel 210 on the left. It is contemplated that the all or almost all of the tape 215 is on the left reel 210 in the initial position and the desired data is located at the beginning of the tape 215. In this scenario, the actuating arm 280 and the magnetic recording head 238 would be tuned to right reel 210. Since the data is located towards the outermost portion of the tape 215, the magnetic recording head 238 is placed closer to the center of the reel 210. If the magnetic recording head 238 comprises a read head, an action may be performed to read the header data from the center of the reel 210. If the magnetic recording head comprises a write head, an action may be performed to write header data to the center of the reel 210. The actuating arm 280 stays in the angled position until the read/write operation 510 on the header data is completed. During operation 510, seeking of the data is begun on the tape 215. As shown in FIG. 5, the seeking of the data involves rotating the reels 210 counterclockwise and loading tape 215 onto the left reel 210. In a scenario where the desired data is located at the beginning of the tape (BOT), the reels 210 rotate clockwise and the tape 215 is loaded onto the right reel 210.

In operation 520, the seeking of the data on the tape 215 continues. During operation 520, no information is read from or written on the magnetic recording surface. The magnetic recording head 238 and actuating arm 280 are located in a neutral position between the two reels 210. In the neutral position, the magnetic recording head 238 does not interfere with the winding of the tape 215.

In operation 530, the seeking of the data on the tape 215 is completed. All data is read from and/or written to the tape 215. During operation 530, no information is read from or written on the magnetic recording surface. The magnetic recording head 238 is located in a neutral position between the two reels 210. In the neutral position, the magnetic recording head 238 does not interfere with the winding of the tape 215.

Figure 6:
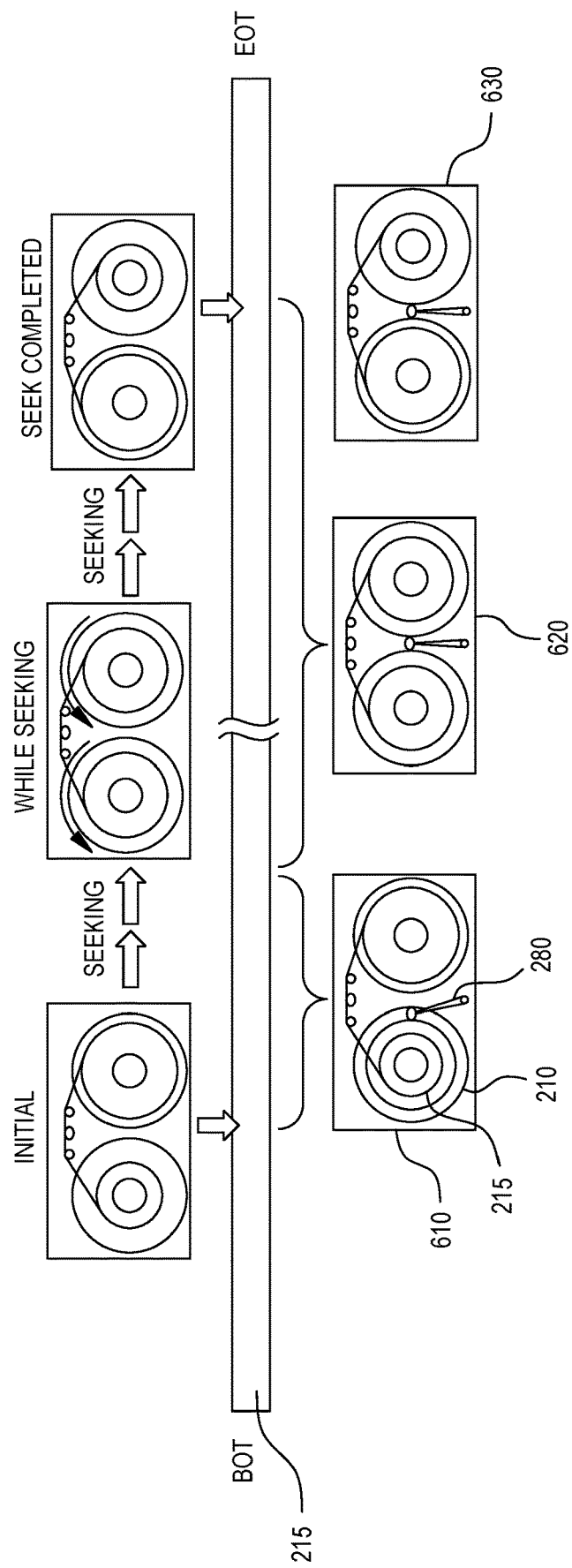
FIG. 6 illustrates a diagram of a method of reading/writing data in the scenario of type seek time, in accordance with one embodiment of the present disclosure.

FIG. 6 illustrates a diagram of a method 600 of reading/writing data in the scenario of type seek time, in accordance with one embodiment of the present disclosure. The method 600 may be utilized with the data storage device 200 of FIGS. 2A-2C. As such, FIGS. 2A-2C may be referred to below. Method 600 details the processing of data when the desired data is located between the center and the outermost portion of the tape 215, and the tape 215 is partially wound about that point.

In operation 610, the data processing is initialized. In FIG. 6, a majority of the tape 215 is on the right reel 210 in the initial position and the desired data is located between the center and the end of the tape (EOT). The actuating arm 280 and the magnetic recording head 238 are tuned to the reel 210 on the left. It is contemplated that the majority of the tape 215 is on the left reel 210 in the initial position and the desired data is located between the center and the beginning of the tape (BOT). In this scenario, the actuating arm 280 and the magnetic recording head 238 would be tuned to right reel 210. Since the data is located towards the center of the tape, the magnetic recording head 238 is placed closer to the outer portion of the reel 210. If the magnetic recording head 238 comprises a read head, an action may be performed to read the header data from the center of the reel 210. If the magnetic recording head 238 comprises a write head, an action may be performed to write header data to the center of the reel 210. The actuating arm 280 and the magnetic recording head 238 stay in the angled position until the read/write operation 610 on the header data is completed. During operation 610, seeking of the data is begun on the tape 215. As shown in FIG. 6, the seeking of the data involves rotating the reels 210 counterclockwise and loading tape 215 onto the left reel 210. In a scenario where the desired data is located between the center and the beginning of the tape (BOT), the reels 210 rotate clockwise and the tape 215 is loaded onto the right reel 210.

In operation 620, the seeking of the data on the tape 215 continues. During operation 620, no information is read from or written on the magnetic recording surface. The magnetic recording head 238 and the actuating arm 280 are located in a neutral position between the two reels 210. In the neutral position, the magnetic recording head 238 does not interfere with the winding of the tape 215.

In operation 630, the seeking of the data on the tape 215 is completed. All data is read from and/or written to the tape 215. During operation 630, no information is read from or written on the magnetic recording surface. The magnetic recording head 238 is located in a neutral position between the two reels 210. In the neutral position, the magnetic recording head 238 and actuating arm 280 do not interfere with the winding of the tape 215.

Figure 7:
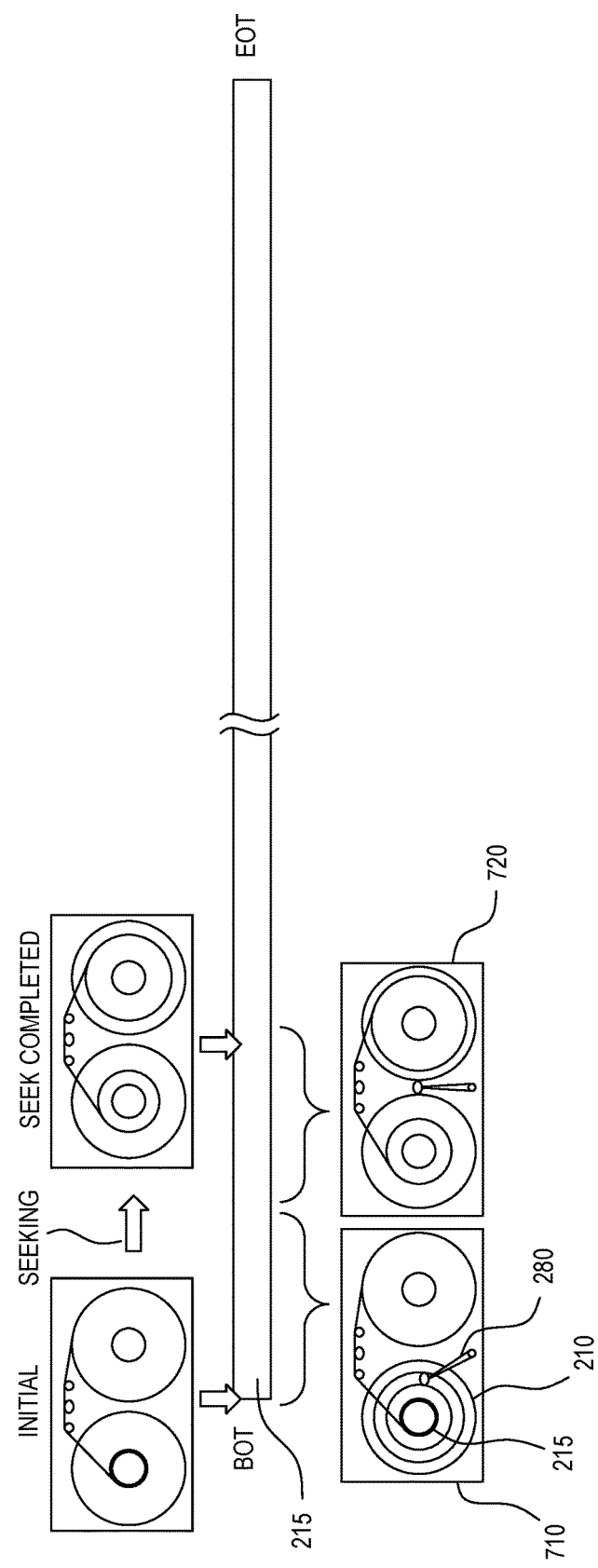
FIG. 7 illustrates a diagram of a method of reading/writing data in the scenario of short seek time, in accordance with one embodiment of the present disclosure.

FIG. 7 illustrates a diagram of a method 700 of reading/writing data in the scenario of short seek time, in accordance with one embodiment of the present disclosure. The method 700 may be utilized with the data storage device 200 of FIGS. 2A-2C. As such, FIGS. 2A-2C may be referred to below. Method 700 details the processing of data when the desired data is located between the center and the outermost portion of the tape 215, and the tape 215 is completely wound about the opposite outermost portion of tape 215.

In operation 710, the data processing is initialized. In FIG. 7, all or almost all of the tape 215 is on the right reel 210 in the initial position and the desired data is located between the center and the beginning of the tape (BOT). The actuating arm 280 and the magnetic recording head 238 are tuned to the reel 210 on the left. It is contemplated that all or almost all of the tape 215 is on the left reel 210 in the initial position and the desired data is located between the center and the end of the tape (EOT). In this scenario, the actuating arm 280 and the magnetic recording head 238 would be tuned to right reel 210. Since the data is located towards the center of the tape, the magnetic recording head 238 is placed closer to the outer portion of the reel 210. If the magnetic recording head 238 comprises a read head, an action may be performed to read the header data from the center of the reel 210. If the magnetic recording head 238 comprises a write head, an action may be performed to write header data to the center of the reel 210. The actuating arm 280 and the magnetic recording head 238 stay in the angled position until the read/write operation 710 on the header data is completed. During operation 710, seeking of the data is begun on the tape 215. As shown in FIG. 7, the seeking of the data involves rotating the reels 210 counterclockwise and loading tape 215 onto the left reel 210. In a scenario where the desired data is located between the center and the beginning of the tape (BOT), the reels 210 rotate clockwise and the tape 215 is loaded onto the right reel 210. After the magnetic recording head 238 finishes the read/write operation, the magnetic recording head 238 and the actuating arm 280 are moved to a neutral position between the two reels 210. In the neutral position, the magnetic recording head 238 and the actuating arm 280 do not interfere with the winding of the tape 215.

In operation 720, the seeking of the data on the tape 215 is completed. All data is read from and/or written to the tape 215. During operation 730, no information is read from or written on the magnetic recording surface. The magnetic recording head 238 and actuating arm 280 are located in a neutral position between the two reels 210. In the neutral position, the magnetic recording head 238 and the actuating arm 280 do not interfere with the winding of the tape 215.

Figure 8:
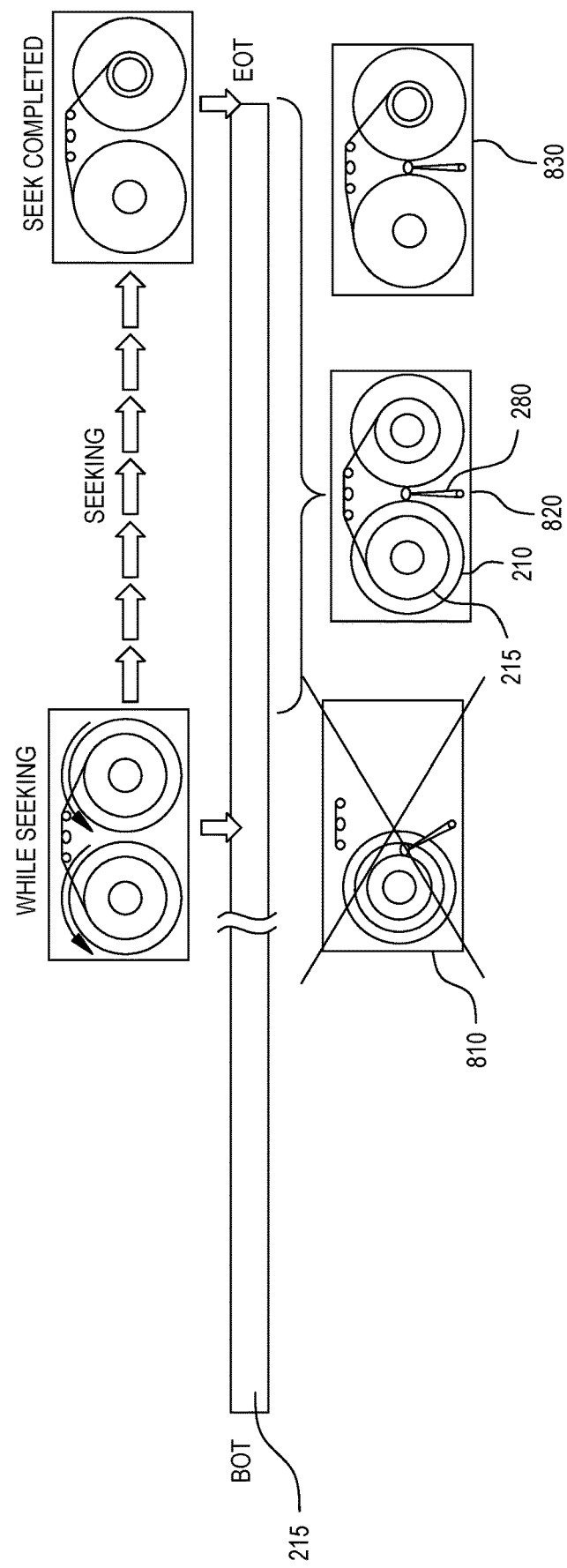
FIG. 8 illustrates a diagram of a method of reading/writing data in the scenario of no disk access, in accordance with one embodiment of the present disclosure.

FIG. 8 illustrates a diagram of a method 800 of reading/writing data in the scenario of no disk access, in accordance with one embodiment of the present disclosure. The method 800 may be utilized with the data storage device 200 of FIGS. 2A-2C. As such, FIGS. 2A-2C may be referred to below. Method 800 details the processing of data when the desired data is located near the outermost portion of the tape 215, and the reels 210 are partially wound.

In operation 810, the data processing is initialized. In FIG. 8, the tape 215 is equally distributed between the left and right reels 210 and the desired data is located at the end of the tape (EOT). The actuating arm 280 and the magnetic recording head 238 are in a neutral position between the two reels 210 because the actuating arm 280 is unable to reach the center of the left magnetic recording surface. It is contemplated that unequal portions of the tape 215 are distributed between the left and right reels 210, where the center of the left reel 210 is inaccessible to the magnetic recording head 238. It is also contemplated that the tape 215 is equally or largely equally distributed between the reels 210 and the desired data is located at the beginning of the tape (BOT). In this scenario, the actuating arm 280 would be in the neutral position because the magnetic recording head 238 would be unable to reach the center of the right magnetic recording surface. Since the data is located towards the outermost portion of the tape 215, the magnetic recording head 238 is placed closer to the center of the reel 210. During operation 810, seeking of the data is begun on the tape 215. In FIG. 8, the seeking of the data involves rotating the reels 210 counterclockwise and loading tape 215 onto the left reel 210. In a scenario where the desired data is located between the center and the beginning of the tape (BOT), the reels rotate clockwise and the tape 215 is loaded onto the right reel 210.

In operation 820, the seeking of the data on the tape 215 continues. During operation 820, no information is read from or written on the magnetic recording surface. The magnetic recording head 238 and the actuating arm 280 are located in a neutral position between the two reels 210. In the neutral position, the magnetic recording head 238 and the actuating arm 280 do not interfere with the winding of the tape 215.

In operation 830, the seeking of the data on the tape 215 is completed. All data is read from and/or written to the tape 215. During operation 830, no information is read from or written on the magnetic recording surface. The magnetic recording head 238 and the actuating arm 280 are located in a neutral position between the two reels 210. Due to the position of the tape during method 800, the header data is written to the magnetic recording surface as a background activity at a later point.

The magnetic recording surface located on the internal surface of the reel may be utilized for many applications. One application is specific management information recording area. Another application is an area used exclusively with tape. Yet another example is work areas that require non-volatility.

Thus, adding a magnetic recording surface to the interior and/or exterior of a reel can shorten the required seek time in tape drives. The data on the magnetic recording surface may be limited to header data and the data on the magnetic tape may be all recorded data. The data may be configured on the magnetic recording surface to accommodate the accumulation of magnetic tape on the reel during a seek operation.

In one embodiment, a data storage device, comprising: a magnetic tape; a tape head configured to write data to and read data from the magnetic tape; a first reel having a first interior surface; a second reel, wherein the first reel and the second reel are configured to wind and unwind the magnetic tape; one or more motors configured to actuate the first reel and the second reel; a first magnetic recording surface disposed on the first interior surface of the first reel; an actuating arm disposed between the first reel and the second reel; an actuator coupled to a distal end of the actuating arm; and a magnetic recording head disposed on the actuating arm. The magnetic recording head being situated a distance away from the actuator, wherein the actuating arm is configured to move about the actuator such that the magnetic recording head is able to contact the first magnetic recording surface to write data to and read data from the first magnetic recording surface.

In another embodiment, the data storage device, wherein the second reel further comprises a second interior surface and a second magnetic recording surface, the second magnetic recording surface being disposed on the second interior surface. The actuating arm is configured such that the second magnetic recording head is able to contact the second magnetic recording surface to write data to and read data from the first magnetic recording surface.

In yet another embodiment, the data storage device, wherein the first magnetic recording surface is configured to store header data and the magnetic tape is configured to store all recorded data.

In another embodiment, the data storage device, wherein the actuating arm is configured to read data from or write data to the first magnetic recording surface while a seek operation is performed on the magnetic tape.

In another embodiment, the data storage device. The magnetic tape comprises: a beginning section configured to store a first plurality of data; a central section configured to store a second plurality of data; and an end section configured to store a third plurality of data. The first magnetic recording surface comprises: an outer section configured to store a fourth plurality of data, the fourth plurality of data corresponding to at least the second plurality of data, and an inner section configured to store a fifth plurality of data, the fifth plurality of data corresponding to the first plurality of data and the second plurality of data.

In another embodiment, the data storage device, further comprising a control circuitry configured to: position the magnetic recording head on the first magnetic recording surface; perform a seek function on a first plurality of data on the first magnetic recording surface; read data from or write to the first magnetic recording surface; perform a seek function on a second plurality of data on the magnetic tape; and read data from or write to the magnetic tape.

In one embodiment, a data storage device, comprising: a magnetic tape; a tape head configured to write data to and read data from the magnetic tape; a pair of reels having a pair of interior surfaces, wherein the pair of reels are configured to wind and unwind the magnetic tape; one or more motors configured to actuate the pair of reels; a pair of magnetic recording surfaces disposed on each interior surface of the pair of interior surfaces; an actuating arm disposed between the pair of reels; a magnetic recording head disposed on a first end of the actuating arm, the first end being disposed adjacent to the pair of reels; and an actuator coupled to a second end of the actuating arm opposite the magnetic recording head. The actuator is configured to move the actuating arm in a first direction and a second direction opposite the first direction such that the magnetic recording head is able to contact the pair of magnetic recording surfaces.

In another embodiment, the data storage device, further comprising a control circuitry configured to: position the magnetic recording head on the pair of magnetic recording surfaces; perform a seek function on a first plurality of data on the pair of magnetic recording surfaces; read data from or write to the pair of magnetic recording surfaces; perform a seek function on a second plurality of data on the magnetic tape; and read data from or write to the magnetic tape.

In yet another embodiment, the data storage device, wherein the pair of reels comprise a pair of exterior surfaces, wherein a pair of exterior magnetic recording surfaces are disposed on the pair of exterior surfaces.

In another embodiment, the data storage device, wherein the actuator is configured to move the actuating arm in a third direction perpendicular to the first direction and a fourth direction opposite the third direction between the pair of interior surfaces and the pair of exterior surfaces.

In yet another embodiment, the data storage device, wherein the actuating arm is configured to rest in a location between the pair of reels when the magnetic recording head is not performing a read or a write operation.

In another embodiment, the data storage device, wherein the actuator moves the actuating arm such that the magnetic recording head contacts a magnetic recording surface of the pair of magnetic recording surfaces at a beginning of a seek operation.

In yet another embodiment, the data storage device, wherein: the magnetic tape comprises: a beginning section configured to store a first plurality of data; a central section configured to store a second plurality of data; and an end section configured to store a third plurality of data. The pair of magnetic recording surfaces each individually comprise: an outer section configured to store a fourth plurality of data, the fourth plurality of data corresponding to at least the second plurality of data, and an inner section configured to store a fifth plurality of data, the fifth plurality of data corresponding to the first plurality of data and the second plurality of data.

In another embodiment, the data storage device, wherein the pair of magnetic recording surfaces are configured to store header data and the magnetic tape is configured to store all recorded data.

In one embodiment, a data storage device, comprising: a magnetic tape; a tape head configured to write data to and read data from the magnetic tape; a pair of reels, each reel having an interior surface, wherein the pair of reels are configured to wind and unwind the magnetic tape; one or more motors configured to actuate the pair of reels; a magnetic recording surface disposed on each interior surface of the pair of reels; an actuating arm disposed between the pair of reels; a magnetic recording head disposed on a first end of the actuating arm, the first end being disposed adjacent to the pair of reels; and means for moving the actuating arm in a first direction and a second direction opposite the first direction such that the magnetic recording head is able to contact the pair of magnetic recording surfaces; and a control circuitry. The control circuitry configured to: position the magnetic recording head on each magnetic recording surface; perform a seek function on a first plurality of data on at least one of the magnetic recording surfaces; control the magnetic recording head to read data from or write to at least one of the magnetic recording surfaces; perform a seek function on a second plurality of data on the magnetic tape; and control the tape head to read from or write to the magnetic tape.

In another embodiment, the data storage device, wherein each reel of the pair of reels further comprise an exterior surface, wherein an exterior magnetic recording surface is disposed on each exterior surface of the pair of reels.

In yet another embodiment, the data storage device, wherein each magnetic recording surface is configured to store header data and the magnetic tape is configured to store all recorded data.

In another embodiment, the data storage device. The magnetic tape comprises: a beginning section configured to store a first plurality of data; a central section configured to store a second plurality of data; and an end section configured to store a third plurality of data. The each magnetic recording surface comprise: an outer section configured to store a fourth plurality of data, the fourth plurality of data corresponding to at least the second plurality of data, and an inner section configured to store a fifth plurality of data, the fifth plurality of data corresponding to the first plurality of data and the second plurality of data.

In yet another embodiment, the data storage device, wherein the means for moving the actuating arm is further configured to move the actuating arm to a rest position between the pair of reels when the magnetic recording head is not performing a read or a write operation.

In yet another embodiment, the data storage device, wherein the performing of the seek function on the first plurality of data occurs simultaneously with the performing of the seek function on the second plurality of data.

In yet another embodiment, the data storage device, wherein the control circuitry is further configured to control the magnetic recording head to read data from or write to each magnetic recording surface after the read or write of data to the magnetic tape when a desired portion of the first plurality of data is covered by the magnetic tape.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a magnetic tape;
   a tape head configured to write data to and read data from the magnetic tape;
   a first reel having a first interior surface;
   a second reel, wherein the first reel and the second reel are configured to wind and unwind the magnetic tape;
   one or more motors configured to actuate the first reel and the second reel;
   a first magnetic recording surface disposed on the first interior surface of the first reel;
   an actuating arm positioned within the data storage device;
   an actuator coupled to a distal end of the actuating arm; and
   a magnetic recording head disposed on the actuating arm, the magnetic recording head being situated a distance away from the actuator, wherein the actuating arm is configured to move about the actuator such that the magnetic recording head is able to contact the first magnetic recording surface to write data to and read data from the first magnetic recording surface.

2. The data storage device of claim 1, wherein the second reel further comprises a second interior surface and a second magnetic recording surface, the second magnetic recording surface being disposed on the second interior surface, and wherein the actuating arm is disposed between the first reel and the second reel, the actuating arm being configured such that the second magnetic recording head is able to contact the second magnetic recording surface to write data to and read data from the first magnetic recording surface.

3. The data storage device of claim 1, wherein the first magnetic recording surface is configured to store header data and the magnetic tape is configured to store all recorded data.

4. The data storage device of claim 1, wherein the actuating arm is configured to read data from or write data to the first magnetic recording surface while a seek operation is performed on the magnetic tape.

5. The data storage device of claim 1, wherein:
   the magnetic tape comprises:
      a beginning section configured to store a first plurality of data;
      a central section configured to store a second plurality of data; and
      an end section configured to store a third plurality of data; and
   the first magnetic recording surface comprises:
      an outer section configured to store a fourth plurality of data, the fourth plurality of data corresponding to at least the second plurality of data, and
      an inner section configured to store a fifth plurality of data, the fifth plurality of data corresponding to the first plurality of data and the second plurality of data.

6. The data storage device of claim 1, further comprising a control circuitry configured to:
   position the magnetic recording head on the first magnetic recording surface;
   perform a seek function on a first plurality of data on the first magnetic recording surface;
   read data from or write to the first magnetic recording surface;
   perform a seek function on a second plurality of data on the magnetic tape; and
   read data from or write to the magnetic tape.

7. A data storage device, comprising:
   a magnetic tape;
   a tape head configured to write data to and read data from the magnetic tape;
   a pair of reels having a pair of interior surfaces, wherein the pair of reels are configured to wind and unwind the magnetic tape;
   one or more motors configured to actuate the pair of reels;
   a pair of magnetic recording surfaces disposed on each interior surface of the pair of interior surfaces;
   an actuating arm disposed between the pair of reels;
   a magnetic recording head disposed on a first end of the actuating arm, the first end being disposed adjacent to the pair of reels; and
   an actuator coupled to a second end of the actuating arm opposite the magnetic recording head, wherein the actuator is configured to move the actuating arm in a first direction and a second direction opposite the first direction such that the magnetic recording head is able to contact the pair of magnetic recording surfaces.

8. The data storage device of claim 7, further comprising a control circuitry configured to:
   position the magnetic recording head on the pair of magnetic recording surfaces;
   perform a seek function on a first plurality of data on the pair of magnetic recording surfaces;
   read data from or write to the pair of magnetic recording surfaces;
   perform a seek function on a second plurality of data on the magnetic tape; and
   read data from or write to the magnetic tape.

9. The data storage device of claim 7, wherein the pair of reels comprise a pair of exterior surfaces, wherein a pair of exterior magnetic recording surfaces are disposed on the pair of exterior surfaces.

10. The data storage device of claim 9, wherein the actuator is configured to move the actuating arm in a third direction perpendicular to the first direction and a fourth direction opposite the third direction between the pair of interior surfaces and the pair of exterior surfaces.

11. The data storage device of claim 7, wherein the actuating arm is configured to rest in a location between the pair of reels when the magnetic recording head is not performing a read or a write operation.

12. The data storage device of claim 7, wherein the actuator moves the actuating arm such that the magnetic recording head contacts a magnetic recording surface of the pair of magnetic recording surfaces at a beginning of a seek operation.

13. The data storage device of claim 7, wherein:
   the magnetic tape comprises:
      a beginning section configured to store a first plurality of data;

a central section configured to store a second plurality of data; and an end section configured to store a third plurality of data; and the pair of magnetic recording surfaces each individually comprise:

an outer section configured to store a fourth plurality of data, the fourth plurality of data corresponding to at least the second plurality of data, and an inner section configured to store a fifth plurality of data, the fifth plurality of data corresponding to the first plurality of data and the second plurality of data.

14. The data storage device of claim 7, wherein the pair of magnetic recording surfaces are configured to store header data and the magnetic tape is configured to store all recorded data.

15. A data storage device, comprising:

a magnetic tape;

a tape head configured to write data to and read data from the magnetic tape;

a pair of reels, each reel having an interior surface, wherein the pair of reels are configured to wind and unwind the magnetic tape;

one or more motors configured to actuate the pair of reels;

a magnetic recording surface disposed on each interior surface of the pair of reels;

an actuating arm disposed between the pair of reels;

a magnetic recording head disposed on a first end of the actuating arm, the first end being disposed adjacent to the pair of reels; and means for moving the actuating arm in a first direction and a second direction opposite the first direction such that the magnetic recording head is able to contact the pair of magnetic recording surfaces; and a control circuitry configured to:

position the magnetic recording head on each magnetic recording surface;

perform a seek function on a first plurality of data on at least one of the magnetic recording surfaces;

control the magnetic recording head to read data from or write to at least one of the magnetic recording surfaces;

perform a seek function on a second plurality of data on the magnetic tape; and control the tape head to read from or write to the magnetic tape.

16. The data storage device of claim 15, wherein each reel of the pair of reels further comprise an exterior surface, wherein an exterior magnetic recording surface is disposed on each exterior surface of the pair of reels.

17. The data storage device of claim 15, wherein each magnetic recording surface is configured to store header data and the magnetic tape is configured to store all recorded data.

18. The data storage device of claim 15, wherein:

the magnetic tape comprises:

a beginning section configured to store a first plurality of data;

a central section configured to store a second plurality of data; and an end section configured to store a third plurality of data; and the each magnetic recording surface comprise:

an outer section configured to store a fourth plurality of data, the fourth plurality of data corresponding to at least the second plurality of data, and an inner section configured to store a fifth plurality of data, the fifth plurality of data corresponding to the first plurality of data and the second plurality of data.

19. The data storage device of claim 15, wherein the means for moving the actuating arm is further configured to move the actuating arm to a rest position between the pair of reels when the magnetic recording head is not performing a read or a write operation.

20. The data storage device of claim 15, wherein the performing of the seek function on the first plurality of data occurs simultaneously with the performing of the seek function on the second plurality of data.

21. The data storage device of claim 15, wherein the control circuitry is further configured to control the magnetic recording head to read data from or write to each magnetic recording surface after the read or write of data to the magnetic tape when a desired portion of the first plurality of data is covered by the magnetic tape.

* * * * *